United States Patent
Lee et al.

(10) Patent No.: US 10,622,636 B2
(45) Date of Patent: Apr. 14, 2020

(54) HIGH-CAPACITY RECHARGEABLE BATTERY STACKS CONTAINING A SPALLED CATHODE MATERIAL

(71) Applicant: International Business Machines Corporation, Armonk, NY (US)

(72) Inventors: Yun Seog Lee, Seoul (KR); Stephen W. Bedell, Wappingers Falls, NY (US); Joel P. de Souza, Putnam Valley, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/721,111

(22) Filed: Sep. 29, 2017

(65) Prior Publication Data
US 2019/0103612 A1 Apr. 4, 2019

(51) Int. Cl.
| | | |
|---|---|---|
| *H01M 4/66* | (2006.01) | |
| *H01M 4/131* | (2010.01) | |
| *H01M 4/136* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |
| *H01M 4/02* | (2006.01) | |

(52) U.S. Cl.
CPC ............ *H01M 4/661* (2013.01); *H01M 4/131* (2013.01); *H01M 4/136* (2013.01); *H01M 4/505* (2013.01); *H01M 4/525* (2013.01); *H01M 4/5825* (2013.01); *H01M 10/0525* (2013.01); *H01M 2004/021* (2013.01); *H01M 2004/028* (2013.01)

(58) Field of Classification Search
CPC ...... H01M 4/131; H01M 4/136; H01M 4/505; H01M 4/525; H01M 4/5825; H01M 4/661; H01M 4/70; H01M 10/0525; H01M 2004/021; H01M 2004/028
See application file for complete search history.

(56) References Cited

U.S. PATENT DOCUMENTS

| | | | |
|---|---|---|---|
| 4,888,259 A * | 12/1989 | Ebner | ........................ C09D 5/24 429/217 |
| 5,879,836 A | 3/1999 | Ikeda et al. | |
| 7,192,673 B1 | 3/2007 | Ikeda et al. | |
| 7,691,529 B2 | 4/2010 | Hennige et al. | |
| 8,247,261 B2 | 8/2012 | Bedell et al. | |
| 8,685,268 B1 | 4/2014 | Yee et al. | |
| 8,691,441 B2 | 4/2014 | Zhamu et al. | |
| 8,709,914 B2 | 4/2014 | Bedell et al. | |
| 8,748,296 B2 | 6/2014 | Bedell et al. | |
| 8,765,302 B2 | 7/2014 | Chen et al. | |
| 8,877,361 B2 | 11/2014 | Byun et al. | |
| 8,927,338 B1 | 1/2015 | Bedell et al. | |
| 8,999,553 B2 | 4/2015 | Anandan et al. | |
| 9,356,188 B2 | 5/2016 | Paranjpe et al. | |
| 9,502,609 B2 | 11/2016 | Bedell et al. | |
| 9,570,775 B2 | 2/2017 | Huang et al. | |
| 9,853,287 B2 | 12/2017 | Mikhaylik et al. | |
| 2008/0050656 A1 | 2/2008 | Eisenbeiser et al. | |
| 2009/0179558 A1 | 7/2009 | Yotsuya | |
| 2009/0208671 A1 | 8/2009 | Nieh et al. | |
| 2010/0104948 A1 | 4/2010 | Skotheim et al. | |
| 2010/0311250 A1 | 12/2010 | Bedell et al. | |
| 2012/0052339 A1 | 3/2012 | Mikhaylik et al. | |
| 2012/0231321 A1 | 9/2012 | Huang et al. | |
| 2012/0237822 A1 * | 9/2012 | Futamura | ............... H01M 4/136 429/211 |
| 2013/0065120 A1 * | 3/2013 | Miwa | ...................... H01M 4/04 429/211 |
| 2013/0309472 A1 | 11/2013 | Halasyamani et al. | |
| 2014/0099544 A1 * | 4/2014 | Hosokawa | .......... H01M 4/0402 429/211 |
| 2014/0170792 A1 | 6/2014 | Draw | |
| 2014/0272560 A1 | 9/2014 | Huang et al. | |
| 2014/0363743 A1 | 12/2014 | Stalder et al. | |
| 2015/0004462 A1 | 1/2015 | Huang | |
| 2015/0380576 A1 | 12/2015 | Kayes et al. | |
| 2016/0071797 A1 | 3/2016 | Gan | |
| 2016/0183358 A1 | 6/2016 | Al-Saud et al. | |
| 2016/0284928 A1 | 9/2016 | Bedell et al. | |

(Continued)

FOREIGN PATENT DOCUMENTS

| | | | |
|---|---|---|---|
| CN | 102005597 A | 4/2011 | |
| CN | 103283064 A | 9/2013 | |

(Continued)

OTHER PUBLICATIONS

Machine translation JP 2012-155974, published on Aug. 16, 2012 (Year: 2012).*
Machine translation of JP 2009-295514, published on Dec. 17, 2009 (Year: 2009).*
Machine translation of JP 2017-073267, published on Apr. 13, 2017 (Year: 2017).*
List of IBM Patents or Patent Applications Treated as Related dated Sep. 29, 2017, 2 pages.
International Search Report and Written Opinion received in International Application No. PCT/IB2018/056915 dated Jan. 21, 2019.

(Continued)

*Primary Examiner* — Anca Eoff
(74) *Attorney, Agent, or Firm* — Scully, Scott, Murphy & Presser, P.C.; L. Jeffrey Kelly, Esq.

(57) ABSTRACT

High-capacity (i.e., a capacity of 50 mAh/gm or greater) and high-performance rechargeable batteries are provided that contain a rechargeable battery stack that includes a spalled material structure that includes a cathode material layer that is attached to a stressor material. The cathode material may include a single crystalline that is devoid of polymeric binders. The stressor material serves as a cathode current collector of the rechargeable battery stack.

9 Claims, 4 Drawing Sheets

(56) References Cited

U.S. PATENT DOCUMENTS

| | | | | |
|---|---|---|---|---|
| 2016/0351947 A1* | 12/2016 | Kamo | ................... | H01M 4/131 |
| 2017/0194449 A1 | 7/2017 | Bedell et al. | | |
| 2018/0006303 A1 | 1/2018 | Mikhaylik et al. | | |

FOREIGN PATENT DOCUMENTS

| | | | |
|---|---|---|---|
| CN | 104051773 A | | 9/2014 |
| CN | 104137312 A | | 11/2014 |
| CN | 206322721 U | | 7/2017 |
| JP | 2004-200011 A | | 7/2004 |
| JP | 2009-295514 | * | 12/2009 |
| JP | 2012-155974 | * | 8/2012 |
| JP | 2017-073267 | * | 4/2017 |
| KR | 10-2013-0129077 A | | 11/2013 |
| WO | 2008153564 A1 | | 12/2008 |

OTHER PUBLICATIONS

International Search Report and Written Opinion received in International Application No. PCT/IB2018/056916 dated Jan. 21, 2019.
Østreng et al., "High power nano-structured V2O5 thin film cathodes by atomic layer deposition", Journal of Materials Chemistry A, Jul. 2014, pp. 15044-15051, vol. 2, No. 36.
Saha et al., "Single heterojunction solar cells on exfoliated flexible ~25 μm thick mono-crystalline silicon substrates", Applied Physics Letters, Apr. 2013, 5 pages, vol. 102, No. 16, 163904.
Hu et al., "Graphene-modified LiFePO 4 cathode for lithium ion battery beyond theoretical capacity", Nature Communications, Apr. 2013, 7 pages, vol. 4, ncomms2705.
Yoon et al., "GaAs photovoltaics and optoelectronics using releasable multilayer epitaxial assemblies", Nature, May 2010, pp. 329-333, vol. 465, No. 7296.
Shahrjerdi et al., "High-efficiency thin-film InGaP/InGaAs/Ge tandem solar cells enabled by controlled spalling technology", Applied Physics Letters, Feb. 2012, 3 pages, vol. 100, No. 5, 053901.
Bedell et al., "Layer transfer of bulk gallium nitride by controlled spalling", Journal of Applied Physics, Jul. 2017, 6 pages, vol. 122, No. 2, 025103.
Office Action dated Apr. 3, 2019 received in U.S. Appl. No. 15/721,061.
Office Action dated May 15, 2019 received in U.S. Appl. No. 15/721,001.
International Search Report dated Jan. 9, 2019 received in a related foreign application.

* cited by examiner

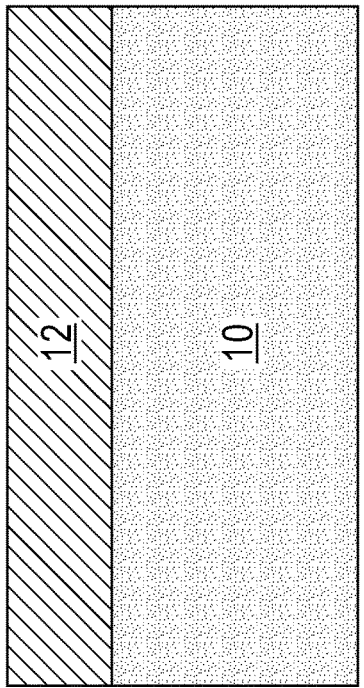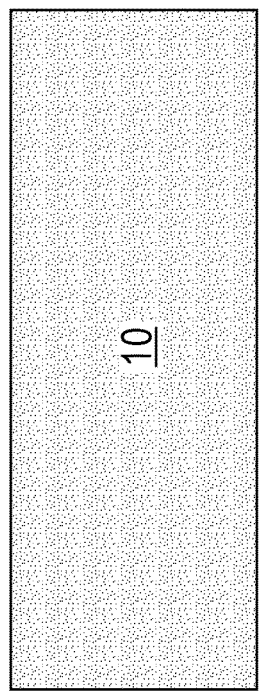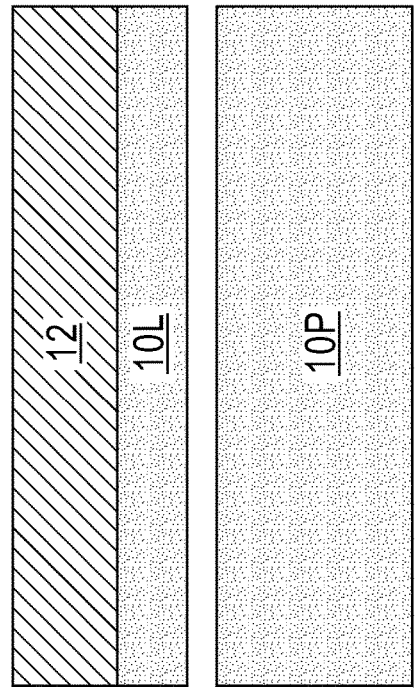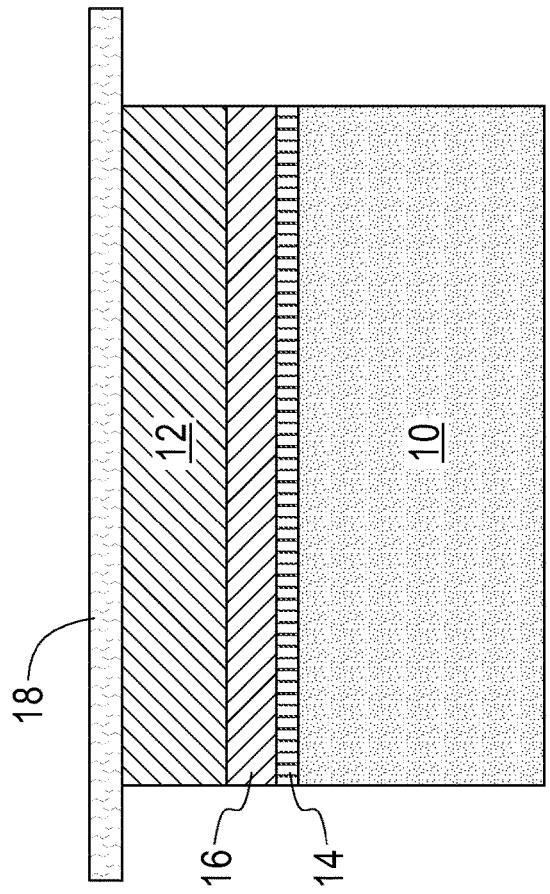

HIGH-CAPACITY RECHARGEABLE BATTERY STACKS CONTAINING A SPALLED CATHODE MATERIAL

BACKGROUND

The present application relates to a rechargeable battery. More particularly, the present application relates a high-capacity and high-performance rechargeable battery stack that includes a spalled material structure including a cathode material layer and a stressor material.

A rechargeable battery is a type of electrical battery which can be charged, discharged into a load, and recharged many times, while a non-rechargeable (or so-called primary battery) is supplied fully charged, and discarded once discharged. Rechargeable batteries are produced in many different shapes and sizes, ranging from button cells to megawatt systems connected to stabilize an electrical distribution network.

Rechargeable batteries initially cost more than disposable batteries, but have a much lower total cost of ownership and environmental impact, as rechargeable batteries can be recharged inexpensively many times before they need replacing. Some rechargeable battery types are available in the same sizes and voltages as disposable types, and can be used interchangeably with them. Despite the numerous rechargeable batteries that exist, there is a need for providing rechargeable batteries that have a high-capacity (i.e., a capacity of 50 mAh/gm or greater) and exhibit high-performance.

SUMMARY

High-capacity (i.e., a capacity of 50 mAh/gm or greater) and high-performance rechargeable batteries are provided that contain a rechargeable battery stack that includes a spalled material structure that includes a cathode material layer that is attached to a stressor material. The cathode material layer of the spalled material structure includes a single crystalline cathode material that is devoid of polymeric binders. The stressor material serves as a cathode current collector of the rechargeable battery stack.

In one embodiment, a rechargeable battery stack is provided that includes a cathode current collector that is composed of a metal stressor material. A single crystalline cathode material layer is located on a physically exposed surface of the cathode current collector. An electrolyte (solid, liquid or gel) is located on a physically exposed surface of the single crystalline cathode material layer. An anode is located on a physically exposed surface of the electrolyte, and an anode current collector is located on a physically exposed surface of the anode.

In another embodiment, a rechargeable battery stack is provided that includes a cathode current collector that is composed of a metal stressor material and having finger portions that are separated by a spalling barrier material portion. A single crystalline cathode material layer portion is located on a physically exposed surface of each finger portion of the cathode current collector and each spalling barrier material portion. An electrolyte (solid, liquid or gel) is located on a physically exposed surface of the single crystalline cathode material layer portion. An anode is located on a physically exposed surface of the electrolyte, and an anode current collector is located on a physically exposed surface of the anode.

BRIEF DESCRIPTION OF SEVERAL VIEWS OF THE DRAWINGS

FIG. 1 is a cross sectional view of an exemplary structure of a cathode material substrate that can be employed in accordance with an embodiment of the present application.

FIG. 2A is a cross sectional view of the exemplary structure of FIG. 1 after forming a stressor layer on a physically exposed surface of the cathode material substrate.

FIG. 2B is a cross sectional view of the exemplary structure of FIG. 1 after forming a material stack of, from bottom to top, a corrosion inhibitor layer, an adhesion layer, a stressor layer and a handle substrate on a physically exposed surface of the cathode material substrate.

FIG. 3 is a cross sectional view of the exemplary structure of FIG. 2A after performing a spalling process.

DETAILED DESCRIPTION

Figure 4B:
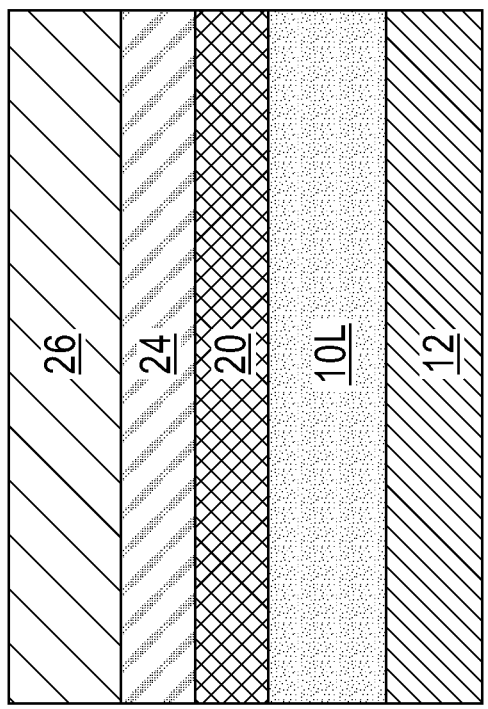
FIG. 4B is a cross sectional view of another rechargeable battery stack which includes a cathode material layer and the stressor layer of the exemplary structure shown in FIG. 3.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

In conventional thin-film solid-state rechargeable batteries, the cathode material layer is formed utilizing a deposition process such as sputtering or evaporation. Such deposition processes are slow and the thickness of the deposited cathode layer is typically limited to less than 5 µm. At such thicknesses, conventional rechargeable batteries typically require an area of several hundred square centimeters to achieve a capacity of 50 mAh/gm or greater. Moreover, deposited cathode layers of the prior art typically contain a polymeric binder material which may cause capacity degradation by cathode volume change during use. Furthermore, lithiated particles in the cathode layer of the prior art are typically annealed prior to pasting them on a metal sheet to improve the crystallinity of the cathode layer. These problems of the prior art are avoided/alleviated in the present application by utilizing the spalling process mentioned herein below. The spalling process of the present application provides a spalled cathode material layer which has already been annealed to obtain a structure that allows the highest possible lithium transport in the cathode material layer, and whose thickness can be controlled by a thickness of the stressor layer and/or the residual stress of the stressor layer. Moreover, the spalling process provides a spalled cathode material layer having an improved uniformity as compared to a deposited cathode material layer. Moreover, the spalling process provides a cost effective means to provide a thick cathode material layer which in turn can improve the capacity of a rechargeable battery containing the same.

Referring first to FIG. 1, there is illustrated an exemplary structure of a cathode material substrate 10 that can be employed in accordance with an embodiment of the present application. As is shown, the cathode material substrate 10 has a uniform thickness across the entire length of the cathode material substrate 10. Moreover, the topmost surface and the bottommost surface of the cathode material substrate 10 that can be employed are both planar across the entire length of the cathode material substrate 10. Stated in other terms, the cathode material substrate 10 that is initially used in the present application has non-textured (i.e., planar or flat) surfaces. The term "non-textured surface" denotes a surface that is smooth and has a surface roughness on the order of less than 100 nm root mean square as measured by profilometry.

The cathode material substrate 10 that can be employed may comprise any cathode material of a rechargeable battery whose fracture toughness is less than that of the stressor material to be subsequently described. Fracture toughness is a property which describes the ability of a material containing a crack to resist fracture. Fracture toughness is denoted $K_{Ic}$. The subscript Ic denotes mode I crack opening under a normal tensile stress perpendicular to the crack, and c signifies that it is a critical value. Mode I fracture toughness is typically the most important value because spalling mode fracture usually occurs at a location in the substrate where mode II stress (shearing) is zero, and mode III stress (tearing) is generally absent from the loading conditions. Fracture toughness is a quantitative way of expressing a material's resistance to brittle fracture when a crack is present.

In one embodiment of the present application, the cathode material that provides the cathode material substrate 10 is a lithiated material such as, for example, a lithium-based mixed oxide. Examples of lithium-based mixed oxides that may be employed as the cathode material substrate 10 include, but are not limited to, lithium cobalt oxide ($LiCoO_2$), lithium nickel oxide ($LiNiO_2$), lithium manganese oxide ($LiMn_2O_4$), lithium cobalt manganese oxide ($LiCoMnO_4$), a lithium nickel manganese cobalt oxide ($LiNi_xMn_yCo_zO_2$), lithium vanadium pentoxide ($LiV_2O_5$) or lithium iron phosphate ($LiFePO_4$).

The cathode material substrate 10 that is employed is a single crystalline cathode material (i.e., a cathode material in which the crystal lattice of the entire sample is continuous and unbroken to the edges of the sample, with no grain boundaries); single crystalline cathode materials can provide fast ion (e.g., Li ion) and electron transport within a rechargeable battery stack. The cathode material substrate 10 is typically devoid of any polymer binder material. Cathode materials devoid of polymer binder materials provide robust operation without capacity degradation by cathode volume change.

The cathode material substrate 10 may have a thickness greater than 100 µm (microns). Other thicknesses can also be used as the thickness of the cathode material substrate 10.

In some embodiments of the present application, at least the topmost surface of the cathode material substrate 10 can be cleaned prior to further processing to remove surface oxides and/or other contaminants therefrom. In one embodiment of the present application, the cathode material substrate 10 is cleaned by applying a solvent such as, for example, acetone and isopropanol, which is capable of removing contaminates and/or surface oxides from the topmost surface of the cathode material substrate 10.

In some embodiments of the present application, the topmost surface of the cathode material substrate 10 can be made hydrophobic by oxide removal prior to use by dipping the topmost surface of the cathode material substrate 10 into hydrofluoric acid. A hydrophobic, or non-oxide, surface provides improved adhesion between the cleaned surface and certain stressor materials to be deposited.

Referring now to FIG. 2A, there is illustrated the exemplary structure of FIG. 1 after forming a stressor layer 12 on a physically exposed surface of the cathode material substrate 10. The stressor layer 12 follows the contour of the cathode material substrate 10 and thus the stressor layer 12 has a planar topmost surface and a planar bottommost surface.

The stressor layer 12 that can be employed in the present application includes any cathode-side electrode material that is under tensile stress on the cathode material substrate 10 at a spalling temperature. As such, the stressor layer 12 can also be referred to herein as a stress-inducing layer; after spalling the stressor layer 12 that is attached to a spalled portion of the cathode material substrate will serve as a cathode current collector (i.e., cathode-side electrode) of a rechargeable battery stack. In accordance with the present application, the stressor layer 12 has a critical thickness and stress value that cause spalling mode fracture to occur within the cathode material substrate 10. By "spalling mode fracture" it is meant that a crack is formed within the cathode material substrate 10 and the combination of loading forces maintain a crack trajectory at a depth below the stressor/substrate interface. By critical condition, it is meant that for a given stressor material and base substrate material combination, a thickness value and a stressor value for the stressor layer is chosen that render spalling mode fracture possible (can produce a $K_I$ value greater than the $K_{IC}$ of the substrate).

The thickness of the stressor layer 12 is chosen to provide the desired fracture depth within the cathode material substrate 10. For example, if the stressor layer 12 is chosen to be nickel (Ni), then fracture will occur at a depth below the stressor layer 12 roughly 2 to 3 times the Ni thickness. The stress value for the stressor layer 12 is then chosen to satisfy the critical condition for spalling mode fracture. This can be estimated by inverting the empirical equation given by $t^* = [(2.5 \times 10^6)(K_{IC}^{3/2})]/\sigma^2$, where $t^*$ is the critical stressor layer thickness (in microns), $K_{IC}$ is the fracture toughness (in units of $MPa \cdot m^{1/2}$) of the cathode material substrate 10 and $\sigma$ is the stress value of the stressor layer (in MPa or megapascals). The above expression is a guide, in practice, spalling can occur at stress or thickness values up to 20% less than that predicted by the above expression.

Illustrative examples of cathode electrode materials that are under tensile stress when applied to the cathode material substrate 10 and thus can be used as the stressor layer 12 include, but are not limited to, titanium (Ti), platinum (Pt), nickel (Ni), aluminum (Al) or titanium nitride (TiN). In one example, the stressor layer 12 includes a stack of, from bottom to top, titanium (Ti), platinum (Pt) and titanium (Ti). In one embodiment, the stressor layer 12 consists of Ni.

In one embodiment, the stressor layer 12 employed in the present disclosure can be formed at a first temperature which is at room temperature (15° C.-40° C.). The stressor layer 12 can be formed utilizing a deposition process that is well known to those skilled in the art including, for example, a physical vapor deposition process (e.g., sputtering or evaporation) or an electrochemical deposition process (e.g., electroplating or electroless plating).

In some embodiments of the present application, the stressor layer 12 has a thickness of from 2 µm to 300 µm. Other thicknesses for the stressor layer 12 that are below and/or above the aforementioned thickness range can also be employed in the present application.

In some embodiments of the present application (not shown in this embodiment), an adhesion layer can be formed directly on the cathode material substrate 10 prior to forming the stressor layer 12. The adhesion layer is employed in embodiments in which the stressor layer to be subsequently formed has poor adhesion to the cathode material that provides the cathode material substrate 10. In some embodiments (not shown in this embodiment), a corrosion inhibitor layer can be formed directly on the cathode material substrate (textured or non-textured) prior to forming the stressor layer 12. In yet another embodiment (not shown in this embodiment, but shown in FIG. 2B), a material stack of, from bottom to top, a corrosion inhibitor layer and an adhesion layer is formed directly on the cathode material substrate 10 prior to forming the stressor layer 12.

Each of the adhesion layer and the corrosion inhibitor layer follows the contour of the underlying cathode material. For example, both the adhesion layer and the corrosion inhibitor layer have planar surfaces.

The adhesion layer that can be employed in some embodiments of the present application includes any metal adhesion material such as, but not limited to, titanium (Ti), tantalum (Ta), titanium nitride (TiN), tantalum nitride (TaN) or any combination thereof. The adhesion layer may comprise a single layer or it may include a multilayered structure comprising at least two layers of different metal adhesion materials.

The adhesion layer that can be employed in the present application can be formed at room temperature (15° C.-40° C., i.e., 288K to 313K) or above. In one embodiment, the adhesion layer can be formed at a temperature which is from 20° C. (293K) to 180° C. (353K). In another embodiment, the adhesion layer can be formed at a temperature which is from 20° C. (293K) to 60° C. (333K). The adhesion layer, which may be optionally employed, can be formed utilizing a deposition technique such as, for example, sputtering or plating. When sputter deposition is employed, the sputter deposition process may further include an in-situ sputter clean process before the deposition.

When employed, the adhesion layer typically has a thickness from 5 nm to 200 nm, with a thickness from 100 nm to 150 nm being more typical. Other thicknesses for the adhesion layer that are below and/or above the aforementioned thickness ranges can also be employed in the present application.

The corrosion inhibitor layer includes any metal or metal alloy that is electrochemically stable with the cathode current collector (i.e., stressor layer) potential. For example, when Ni is employed as the cathode current collector (i.e., stressor) material, the corrosion inhibitor layer may be composed of aluminum (Al). The corrosion inhibitor layer may comprise a single layer or it may include a multilayered structure comprising at least two layers of corrosion inhibitor materials.

The corrosion inhibitor layer may have a thickness from 2 nm to 400 nm; although other thicknesses that are lesser than or greater than the aforementioned thickness range may also be employed. The corrosion inhibitor layer can be formed by a deposition process including, for example, chemical vapor deposition (CVD), plasma-enhanced chemical vapor deposition (PECVD), atomic layer deposition (ALD), or physical vapor deposition (PVD) techniques that may include evaporation and/or sputtering. The corrosion inhibitor layer may be formed within temperatures ranges mentioned above for the adhesion layer.

In accordance with the present application, the adhesion layer and/or the corrosion inhibitor layer is (are) formed at a temperature which does not effectuate spontaneous spalling to occur within the cathode material substrate (textured or non-textured). By "spontaneous" it is meant that the removal of a thin material layer from a substrate occurs without the need to employ any manual means to initiate crack formation and propagation for breaking apart the thin material layer from the base substrate. By "manual" it is meant that crack formation and propagation are explicit for breaking apart the thin material layer from the substrate.

In some embodiments (not shown in this embodiment, but shown in FIG. 2B), a handle substrate can be attached to a physically exposed surface of the stressor layer 12 prior to spalling. The handle substrate may include any flexible material which has a minimum radius of curvature that is typically less than 30 cm. Illustrative examples of flexible materials that can be employed as the handle substrate include a polymeric tape, a metal foil or a polyimide foil. The handle substrate can be used to provide better fracture control and more versatility in handling the spalled portion of the cathode material substrate. Moreover, the handle substrate can be used to guide the crack propagation during spalling. The handle substrate is typically, but not necessarily, formed at a first temperature which is at room temperature (15° C.-40° C.).

The handle substrate typical has a thickness of from 1 μm to few mm, with a thickness of from 70 μm to 120 μm being more typical. Other thicknesses for the handle substrate that are below and/or above the aforementioned thickness ranges can also be employed in the present disclosure. In some embodiments, the handle substrate can be employed to the attached to the physically exposed surface of the stressor layer utilizing an adhesive material.

Referring now to FIG. 2B, there is illustrated the exemplary structure of FIG. 1 after forming a material stack of, from bottom to top, a corrosion inhibitor layer 14, an adhesion layer 16, a stressor layer 12 and a handle substrate 18 on a physically exposed surface of the cathode material substrate 10. Each of the corrosion inhibitor layer 14, adhesion layer 16, stressor layer 12 and handle substrate 18 has been defined above.

Referring now to FIG. 3, there is illustrated the exemplary structure of FIG. 2A after performing a spontaneous spalling process (hereinafter just "spalling"). Although spalling is shown on the exemplary structure shown in FIG. 2A, spalling may be performed on the exemplary structure shown in FIG. 2B or any other structure that includes at least the cathode material substrate 10 and the stressor layer 12. Spalling is a controlled and scalable surface layer removal process in which a thin layer of a material is removed from a base substrate without utilizing an etching process or mechanical means. By thin, it is meant that the removed layer thickness is typically less than 200 μm. In some embodiments, the cathode material layer 10L that can be removed by spalling can have a thickness that is greater than 5 μm and less than 50 μm. In other embodiments, the cathode material layer 10L that can be removed by spalling can have a thickness that is greater than 5 μm and less than 100 μm. In some embodiments, the cathode material layer 10L that can be removed by spalling can have a thickness of less than 5 μm. In some applications, a battery stack is provided that has high capacity; this is particularly observed when the cathode material layer 10L has a thickness of greater than 5 μm and, preferably greater than 10 μm. By "high capacity" it is meant a capacity of 50 mAh/gm or greater. In some embodiments, spalling may be aided by pulling or peeling the handle substrate 18 away from structure including cathode material substrate 10 and stressor layer 12.

In the present application, the spalling process removes a portion of the cathode material from the cathode material substrate 10. The removed portion of the cathode material, which is still attached to the stressor layer 12, is referred to herein as cathode material layer 12L (e.g., spalled cathode material layer). The cathode material layer 12L that is removed from the original cathode material substrate is single crystalline. The remaining portion of the cathode material substrate 10, which is no longer attached to the stressor layer, is referred to herein as a cathode material substrate portion 10P. The cathode material substrate portion 10P can be reused in other applications. The cathode material layer 10L and the attached stressor layer 12 (an optionally the adhesion layer and/or the optional corrosion inhibitor layer) may be referred to herein as a spalled material layer structure.

Spalling can be initiated at room temperature or at a temperature that is less than room temperature. In one embodiment, spalling is performed at room temperature (i.e., 20° C. to 40° C.). In another embodiment, spalling is performed at a temperature less than 20° C. In a further embodiment, spalling occurs at a temperature of 77 K or less. In an even further embodiment, spalling occurs at a temperature of less than 206 K. In still yet another embodiment, spalling occurs at a temperature from 175 K to 130 K. When a temperature that is less than room temperature is used, the less than room temperature spalling process can be achieved by cooling the structure down below room temperature utilizing any cooling means. For example, cooling can be achieved by placing the structure in a liquid nitrogen bath, a liquid helium bath, an ice bath, a dry ice bath, a supercritical fluid bath, or any cryogenic environment liquid or gas.

When spalling is performed at a temperature that is below room temperature, the spalled structure is returned to room temperature by allowing the spalled structure to slowly warm up to room temperature by allowing the same to stand at room temperature. Alternatively, the spalled structure can be heated up to room temperature utilizing any heating means. After spalling, the handle substrate can be removed from the spalled material layer structure. The handle substrate 18 can be removed from the spalled material layer structure utilizing conventional techniques well known to those skilled in the art. For example, UV or heat treatment can be used to remove the handle substrate.

Figure 4A:
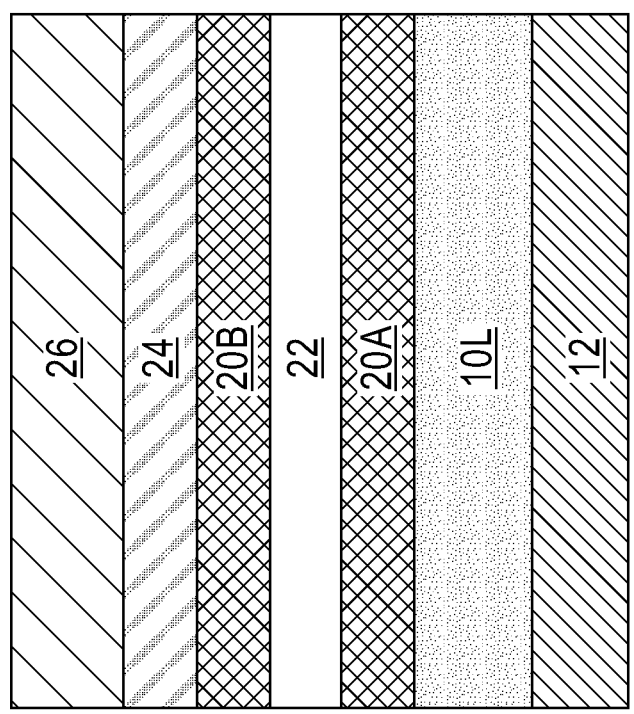
FIG. 4A is a cross sectional view of a rechargeable battery stack which includes a cathode material layer and the stressor layer of the exemplary structure shown in FIG. 3.

Referring now to FIGS. 4A and 4B, there are shown various rechargeable battery stacks which include the spalled material structure (10L/12) shown in FIG. 3. Notably, the rechargeable battery stack shown in FIG. 4A includes a stressor layer 12 as the cathode current collector (i.e., cathode-side electrode), a cathode material layer 10L, a first region 20A of an electrolyte, a separator 22, a second region 20B of an electrolyte, an anode 24 and an anode current collector 26 (i.e., anode-side electrode). The rechargeable battery stack shown in FIG. 4B is similar to the one shown in FIG. 4A except that a single region 20 of electrolyte is present; no separator is used in the rechargeable battery shown in FIG. 4B.

In providing the rechargeable battery stacks shown in FIGS. 4A-4B, the spalled material structure (10L/12) shown in FIG. 3 is flipped such that the stressor layer 12 is located beneath the cathode material layer 10L and then the other components of the rechargeable battery stack are formed one atop the other above the cathode material layer 10L.

The electrolyte that can be used in the present application may include any conventional electrolyte that can be used in a rechargeable battery. The electrolyte may be a liquid electrolyte, a solid-state electrolyte or a gel type electrolyte. In some embodiments, the solid-state electrolyte may be a polymer based material or an inorganic material. In other embodiments, the electrolyte is a solid-state electrolyte that includes a material that enables the conduction of lithium ions. Such materials may be electrically insulating or ionic conducting. Examples of materials that can be employed as the solid-state electrolyte include, but are not limited to, lithium phosphorus oxynitride (LiPON) or lithium phosphosilicate oxynitride (LiSiPON).

In embodiments in which a solid-state electrolyte layer is employed, the solid-state electrolyte may be formed utilizing a deposition process such as, sputtering, solution deposition or plating. In one embodiment, the solid-state electrolyte is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The separator 22, which is used in cases in which a liquid electrolyte is used, may include one or more of a flexible porous material, a gel, or a sheet that is composed of cellulose, cellophane, polyvinyl acetate (PVA), PVA/cellulose blends, polyethylene (PE), polypropylene (PP) or a mixture of PE and PP. The separator 22 may also be composed of inorganic insulating nano/microparticles.

The anode 24 may include any conventional anode material that is found in a rechargeable battery. In some embodiments, the anode 24 is composed of a lithium metal, a lithium-base alloy such as, for example, $Li_xSi$, or a lithium-based mixed oxide such as, for example, lithium titanium oxide ($Li_2TiO_3$). The anode 24 may also be composed of Si, graphite, or amorphous carbon.

In some embodiments, the anode 24 is formed prior to performing a charging/recharging process. In such an embodiment, the anode 24 can be formed utilizing a deposition process such as, for example, chemical vapor deposition (CVD), plasma enhanced chemical vapor deposition (PECVD), evaporation, sputtering or plating. In some embodiments, the anode 24 is a lithium accumulation region that is formed during a charging/recharging process. The anode 24 may have a thickness from 20 nm to 200 μm.

The anode current collector 26 (i.e., anode-side electrode) may include any metallic electrode material such as, for example, titanium (Ti), platinum (Pt), nickel (Ni), copper (Cu) or titanium nitride (TiN). In one example, the anode current collector 26 includes a stack of, from bottom to top, nickel (Ni) and copper (Cu). In one embodiment, the metallic electrode material that provides the anode current collector 26 may be the same as the metallic electrode material that provides the cathode current collector (i.e., stressor layer 12). In another embodiment, the metallic electrode material that provides the anode current collector 26 may be different from the metallic electrode material that provides the cathode current collector. The anode current collector 26 may be formed utilizing a deposition process such as, for example, chemical vapor deposition, sputtering or plating. The anode current collector 26 may have a thickness from 100 nm to 200 μm.

Figure 5:
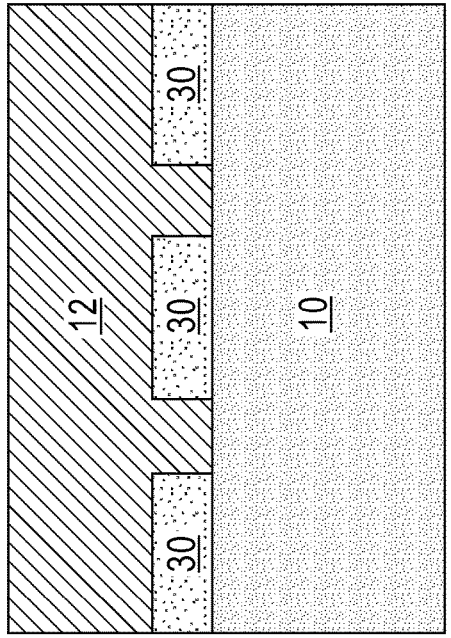
FIG. 5 is a cross sectional view of another exemplary structure including a plurality of patterned spalling barrier layer portions located on a physically exposed surface of a cathode material substrate that can be employed in another embodiment of the present application.

Referring now to FIG. 5, there is illustrated another exemplary structure including a plurality of patterned spalling barrier layer portions 30 located on a physically exposed surface of a cathode material substrate 10 that can be employed in another embodiment of the present application. As is shown, each patterned spalling barrier layer portion 30 is spaced apart from other patterned spalling barrier layer portions 30 by a gap, G. The patterned spalling barrier layer portions 30 prevent spalling in the areas of the cathode material substrate 10 that are located directly beneath the patterned spalling barrier layer portion 30. Spalling will occur in areas in the cathode material substrate 10 that are devoid of the patterned spalling barrier layer portion 30 (i.e., spalling occurs beneath each gap, G).

Each patterned spalling barrier layer portion 30 includes a spalling barrier material such as, for example, a dielectric material or polymeric material. In one embodiment, each patterned spalling barrier layer portion 30 includes silicon dioxide or silicon nitride. The patterned spalling barrier layer portions 30 are formed by first depositing a layer of a spalling barrier material, and thereafter patterning the layer of spalling barrier material. The patterning may be performed by lithography and etching. The layer of spalling barrier material may have a thickness from 100 nm to 500 μm.

Figure 6:
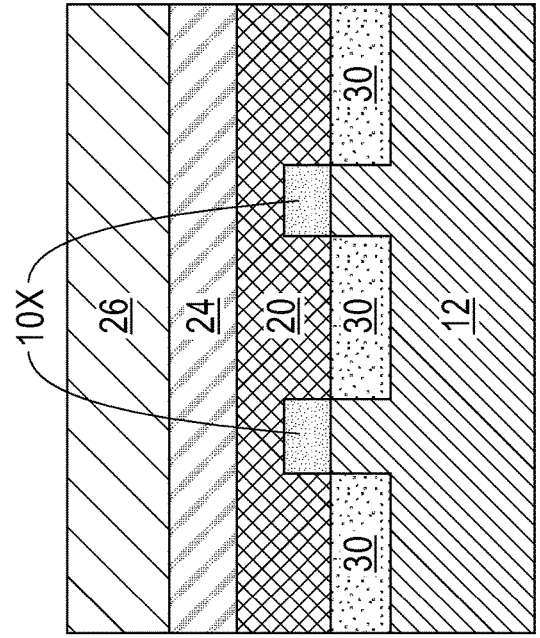
FIG. 6 is a cross sectional view of the exemplary structure of FIG. 5 after forming a stressor layer.

Referring now to FIG. 6, there is illustrated the exemplary structure of FIG. 5 after forming a stressor layer 12. The stressor layer 12 of this embodiment is the same as the stressor layer 12 defined in the previous embodiment of the present application. In this embodiment of the present application, the stressor layer 12 is formed on physically exposed sidewall surfaces and a topmost surface of each patterned spalling barrier layer portion 30. Portions of the stressor layer 12 will fill in the gaps between each patterned spalling barrier layer portion 30 as is shown in FIG. 6 and can directly contact a physically exposed portion of the cathode material substrate 12 not protected by a patterned spalling barrier layer portion 30. In some embodiments, a material stack of, from bottom to top, a corrosion inhibitor layer, an adhesion layer, a stressor layer and a handle substrate can be formed on the exemplary structure shown in FIG. 5. Each of the corrosion inhibitor layer, adhesion layer, stressor layer and handle substrate has been defined above.

Figure 7:
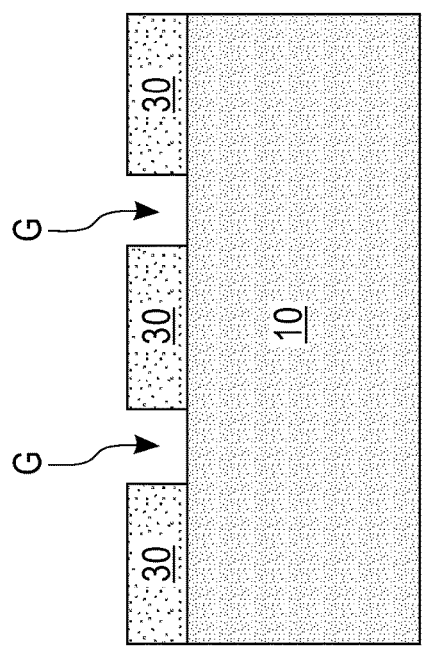
FIG. 7 is a cross sectional view of the exemplary structure of FIG. 6 after performing a spalling process.

Referring now to FIG. 7, there is illustrated the exemplary structure of FIG. 6 after performing a spontaneous spalling process. Spalling is performed as defined above in the previous embodiment of the present application (See, for example, FIG. 3). In this embodiment, the spalled material structure includes a plurality of cathode material layer portions 10X (e.g., spalled cathode material layer portions) that are spaced apart from each other. Cathode material layer portions 10X are also single crystalline. The size and shape of each of the cathode material layer portions 10X is determined by the size and shape of the gap that is located between each of the patterned spalling barrier layer portions 30.

In instances in which a handle substrate is present, the handle substrate can be removed from the spalled material structure after spalling utilizing the techniques mentioned above.

Figure 8:
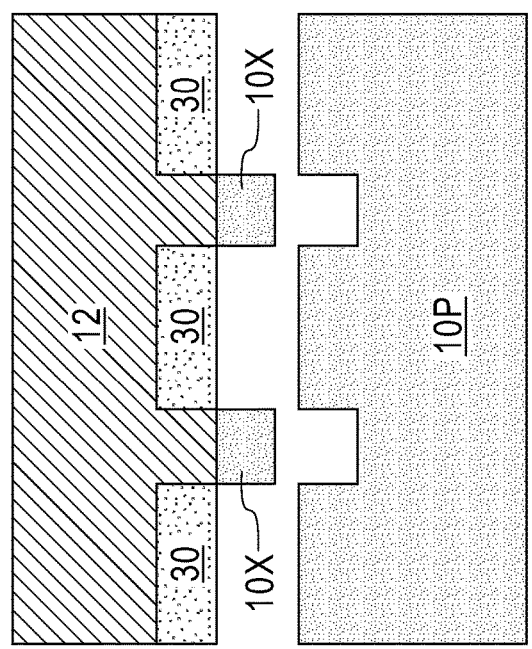
FIG. 8 is a cross sectional view of a rechargeable battery stack which includes the cathode material layer portions and the stressor layer of the exemplary structure shown in FIG. 7.

Referring now to FIG. 8, there is illustrated a structure containing a rechargeable battery stack which includes the cathode material layer portions 10X and the stressor layer 12 of the exemplary structure shown in FIG. 7. In this embodiment, the stressor layer 12 (which serves as the cathode current collector) includes finger like portions that extend between each of the patterned spalling barrier layer portions 30. Moreover, the rechargeable battery stack of FIG. 8 further includes an area 20 of an electrolyte present surrounding and above each cathode material layer portion 10X; a separator may be included in some embodiments within area 20, an anode 24 is located on the electrolyte and an anode current collector 26 is located on the anode 24. Each of the electrolyte, separator, anode and anode current collector of this embodiment are the same as described above in the previous embodiment of the present application.

In providing the rechargeable battery stacks shown in FIG. 8, the spalled material structure (10X, 12, 30) shown in FIG. 7 is flipped such that the stressor layer 12 is located beneath the cathode material layer portions 10X and then the other components of the rechargeable battery stack are formed one atop the other.

Figure 12:
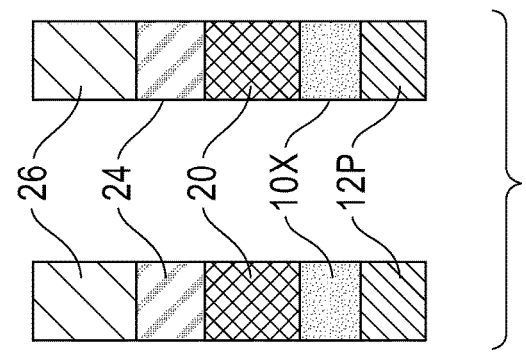
FIG. 12 is a cross sectional view of a plurality of rechargeable battery stacks, each stack including the cathode material layer portions and the patterned stressor layer portions of the exemplary structure shown in FIG. 11.

In some embodiments, the structure shown in FIG. 8 may be subjected to a singulation process such as, for example, dicing, to provide multiple micro-size rechargeable battery stacks such as shown, for example, in FIG. 12. By "micro-size" it is meant a battery stack with a lateral dimension of less than 1 mm.

Figure 9:
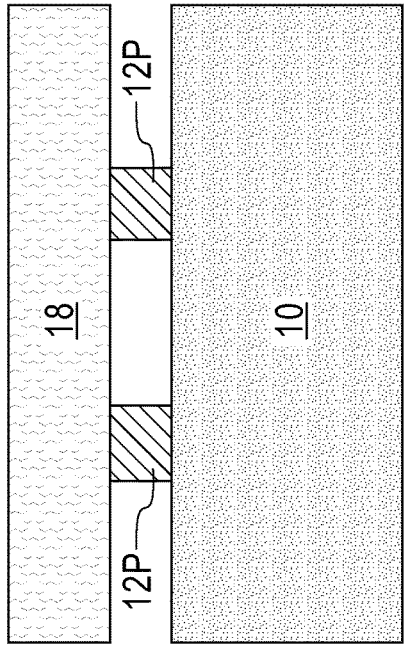
FIG. 9 is a cross sectional view of a yet other exemplary structure including a plurality of patterned stressor layer portions located on a physically exposed surface of a cathode material substrate that can be employed in another embodiment of the present application.

Referring now to FIG. 9, there is illustrated a yet other exemplary structure including a plurality of patterned stressor layer portions 12P located on a physically exposed surface of a cathode material substrate 10 that can be employed in another embodiment of the present application. As is shown, each patterned stressor layer portion 12P is separated by a gap. Each patterned stressor layer portions 12P can be provided by first providing the structure shown in FIG. 2A, and thereafter subjecting such a structure to a patterning process such as, for example, lithography and etching. In some embodiments, a material stack of a corrosion inhibitor layer, an adhesion layer and a stressor layer as shown in FIG. 2B is first formed, and thereafter such a material stack is patterned by lithography and etching to provide patterned material stacks that contain a stressor layer portion 12P. In this embodiment, the size and shape of each stressor layer portion 12P determines the size and shape of the cathode material layer portions to be removed via spalling.

Figure 10:
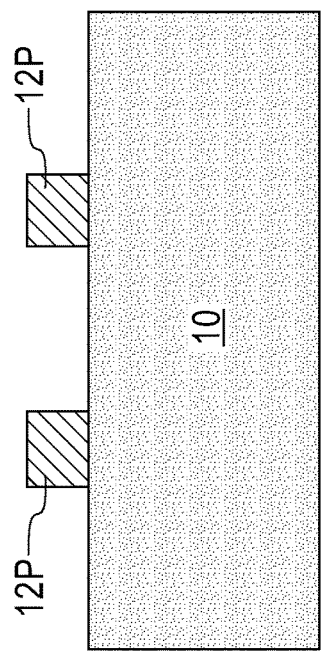
FIG. 10 is a cross sectional view of the exemplary structure of FIG. 9 after forming a handle substrate.

Referring now to FIG. 10, there is illustrated the exemplary structure of FIG. 9 after forming a handle substrate 18. The handle substrate 18 includes one of the materials mentioned previously in the present application. As is shown, portions of the bottommost surface of the handle substrate 18 are in direct contact with a topmost surface of each stressor layer portion 12P; the remaining portions of the handle substrate 18 are suspended above the stressor layer portions 12P.

Figure 11:
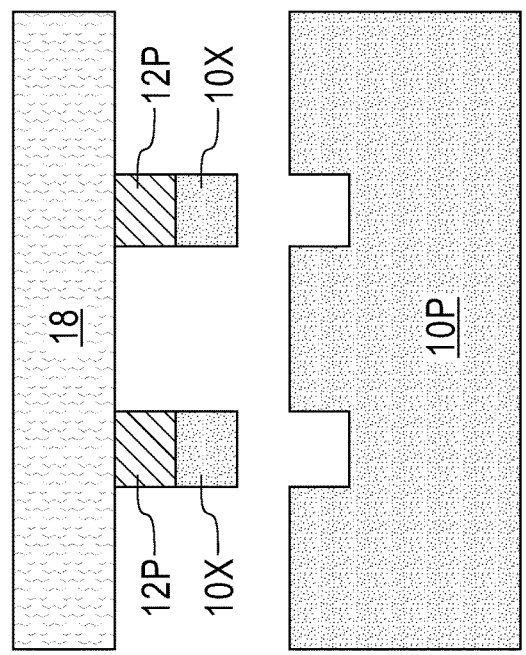
FIG. 11 is a cross sectional view of the exemplary structure of FIG. 10 after performing a spalling process.

Referring now to FIG. 11, there is illustrated the exemplary structure of FIG. 10 after performing a spontaneous spalling process. The spalling process is as defined above. In this embodiment, each cathode material layer portion 10X has sidewall surfaces that are vertically aligned to sidewall surfaces of one of the stressor layer portions 12P.

Referring now to FIG. 12, there is illustrated a plurality of rechargeable battery stacks, each stack including the cathode material layer portions 10X and the patterned stressor layer portions 12P of the exemplary structure shown in FIG. 11. This structure can be formed by first removing the handling substrate 18 from the individual spalled material stacks (10X/12P), and then transferring the individual spalled material stacks (10X)/12P) to a support substrate (not shown) such that a physically exposed surface of the cathode material layer portion 12P contacts a surface of the support substrate. Next, the remaining components of a battery stack (i.e., electrolyte, an anode and an anode current collector) are formed and thereafter, a singulation process such as, for example, dicing, may be performed to provide multiple micro-size rechargeable battery stacks such as shown in FIG. 12. A portion of the support substrate (not shown) may reside beneath each of the micro-size rechargeable battery stacks.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A rechargeable battery stack comprising:
   a cathode current collector that is composed of a metal stressor material and having finger portions that are separated by a spalling barrier material portion;
   a single crystalline cathode material layer portion located on physically exposed surfaces of each finger portion of the cathode current collector, wherein each single crystalline cathode material layer portion has outermost sidewalls that are vertically aligned to outermost sidewalls of one of the finger portions of the cathode current collector;
   an electrolyte located on physically exposed surfaces including the outermost sidewalls of each single crystalline cathode material layer portion and a physically exposed surface of each spalling barrier material portion;
   an anode located on a physically exposed surface of the electrolyte; and
   an anode current collector located on a physically exposed surface of the anode.

2. The rechargeable battery stack of claim 1, wherein the electrolyte is in a liquid state and wherein a separator separates a first region of the electrolyte from a second region of the electrolyte.

3. The rechargeable battery stack of claim 1, wherein the single crystalline cathode material layer portion has a thickness of greater than 5 µm and less than 100 µm.

4. The rechargeable battery stack of claim 1, wherein the single crystalline cathode material layer portion is devoid of a polymeric binder material.

5. The rechargeable battery stack of claim 1, wherein the single crystalline cathode material layer portion is a lithiated material.

6. The rechargeable battery stack of claim 5, wherein the lithiated material comprises lithium cobalt oxide ($LiCoO_2$), lithium nickel oxide ($LiNiO_2$), lithium manganese oxide ($LiMn_2O_4$), lithium cobalt manganese oxide ($LiCoMnO_4$), a lithium nickel manganese cobalt oxide ($LiNi_xMn_yCo_zO_2$), lithium vanadium pentoxide ($LiV_2O_5$) or lithium iron phosphate ($LiFePO_4$).

7. The rechargeable battery stack of claim 1, wherein the electrolyte is a solid- or gel-type electrolyte.

8. The rechargeable battery stack of claim 1, further comprising a material stack of, from bottom to top, a corrosion inhibitor layer and an adhesion layer located between the single crystalline cathode material layer portion and the metal stressor material.

9. The rechargeable battery stack of claim 1, wherein the rechargeable battery has a capacity of 50 mAh/gm or greater.

* * * * *